Dec. 16, 1924.  
W. E. MITTON  
1,519,154  
APPARATUS FOR INVERTING TRAYS AND THE LIKE  
Filed Sept. 10, 1923
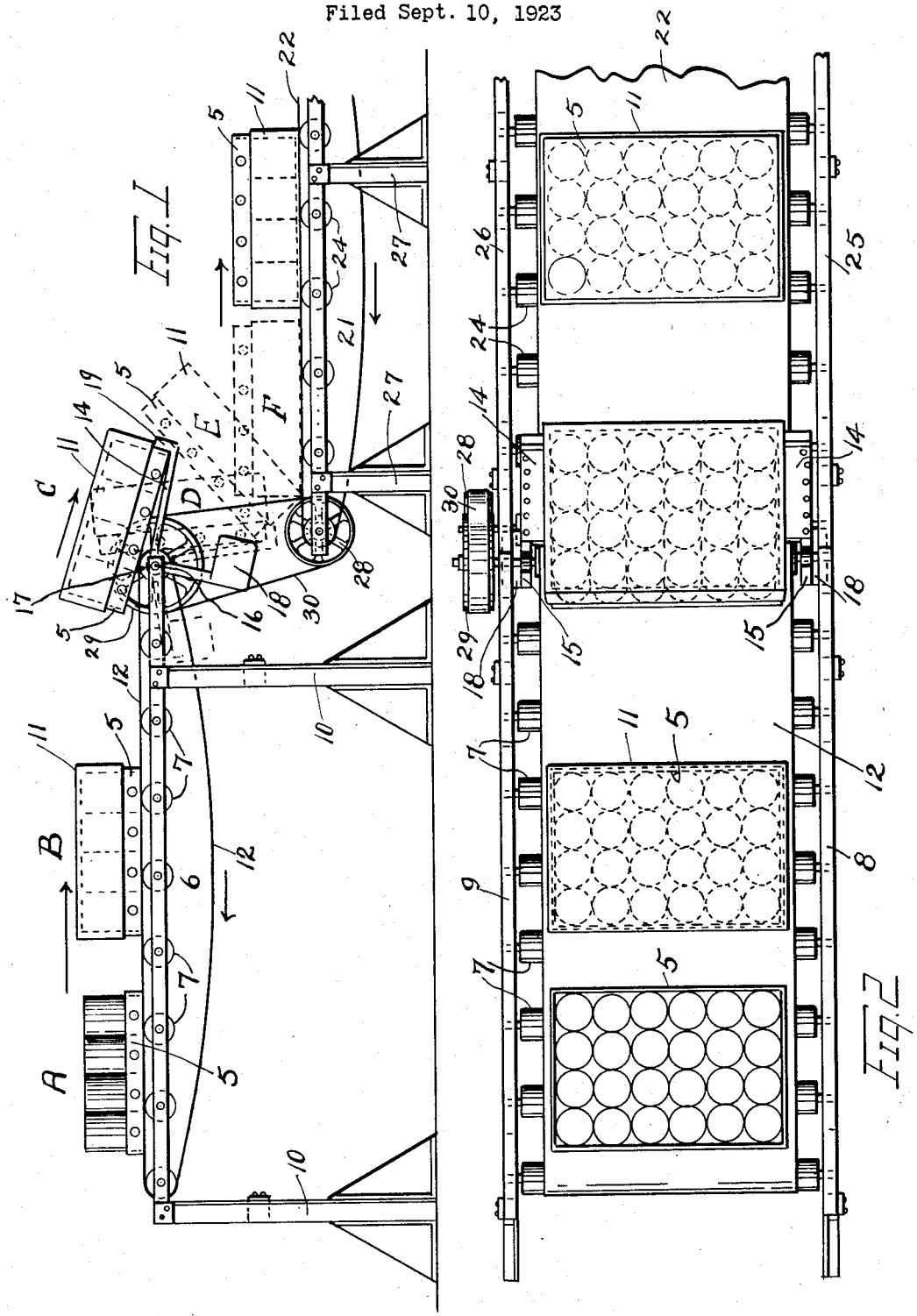
INVENTOR  
William E. Mitton  
BY his  
ATTORNEY Archibald Cox Patented Dec. 16, 1924.

1,519,154

UNITED STATES PATENT OFFICE.

WILLIAM E. MITTON, OF NEW LONDON, WISCONSIN, ASSIGNOR TO THE BORDEN COMPANY, OF NEW YORK, N. Y., A CORPORATION OF NEW JERSEY.

APPARATUS FOR INVERTING TRAYS AND THE LIKE.

Application filed September 10, 1923. Serial No. 661,809.

*To all whom it may concern:*

Be it known that I, WILLIAM E. MITTON, a citizen of the United States, residing in New London, in the county of Waupaca, in the State of Wisconsin, have invented certain new and useful Improvements in Apparatus for Inverting Trays and the like, of which the following is a specification.

The invention relates to an apparatus for inverting trays and the like.

It is customary to subject canned foods, such as milk and the like, to a sterilizing process. The cans are conveniently handled by being placed in iron trays which usually contain about twenty-four cans. When the cans come from the sterilizing apparatus they are transferred to wooden trays in which they are conveyed to the storehouse. The common practice is to have the wooden trays of the same size as the iron trays and as the iron trays are taken from the sterilizer to place the wooden trays upside down on top of the cans which project upwardly from the iron trays, then invert the trays and cans and remove the iron trays. This procedure entails the expenditure of considerable time and labor. The object of the invention is to reduce the cost of transferring the cans from the iron trays to the wooden trays. To this end, the invention consists in the provision of a conveyor which receives the cans in the iron trays from the sterilizing apparatus. This conveyor is long enough to permit a workman to place an inverted wooden tray on the cans. At the discharge end of the conveyor is a platform which receives the iron trays. This platform is arranged to receive an iron tray with the cans and wooden tray, and when the latter are properly positioned to invert them, depositing them upon another conveyor from which they are taken to storage. While the cans are traveling in the wooden tray on the second conveyor the iron tray is removed by the workman. The invention is more fully described hereinafter and is particularly pointed out in the appended claims.

In the accompanying drawings illustrating the preferred form of the invention, Fig. 1 is a side elevation of the improved tray inverting apparatus; and Fig. 2 is a top plan of the parts shown in Fig. 1.

The trays 5 to be inverted are received from the sterilizing apparatus or other source by a conveyor generally indicated at 6. The conveyor 6 comprises a plurality of rollers 7 journalled at their opposite ends in the longitudinally arranged bars 8 and 9, which are supported on the uprights 10. The trays 5 are supported on and carried forward by a conveyor belt 12 which rests on the top of the rollers and travels in the direction indicated by the arrows at the left in Fig. 1. The rollers 7 are placed near enough together so that the trays will be properly supported on the belt 12. The trays 5 are shallow rectangular box-like structures, adapted to hold, for example, twenty-four cans placed upright in the trays, as indicated in the drawings. When a tray 5 containing its upstanding cans, as shown in full lines at position A, has been placed on the receiving end of the conveyor 6 and is carried forward by the belt 12, a workman places an inverted tray 11 on the top of the upstanding cans, as indicated at position B.

When the iron tray 5 with the inverted wooden tray 11 placed on the top of the cans is carried forward to position C, it is received by a platform 14, by which the two trays with the cans between them are inverted, the wooden tray 11 being shifted to the bottom and the iron tray 5 to the top. The platform 14 extends forwardly from the conveyor 6 and is provided at its rear side with the ears 15 which are pivotally connected with the shaft 16 on which the foremost roller 17 is mounted. The platform 14 is normally held in its tray receiving position, as shown in full lines in Fig. 1, by means of the counter-weights 18. In this position the platform and counter-weights are in equilibrium which is overcome when the trays and cans are properly positioned on the platform by the conveyor 6.

It will be observed that the upper surface of the platform 14 is somewhat below the upper section of the conveyor belt 12 resting on the rollers 7. The tray 5 is carried forward in a substantially horizontal position by the conveyor belt 12 until it is more than half way beyond the axis of the roller 17. Thereupon the forward end of the tray drops upon the platform 14 and the front edge of the tray is caught and supported by the forward edge 19 of the platform. The weight of the trays and the cans being greater than the counterweight 18, the platform with the trays and cans is first swung into the position indicated by the dotted lines at position D. The momentum imparted to the trays and cans then carries them into position F, onto the discharge conveyor indicated generally at 21. It will be observed that as the trays and cans fall from position D into position F, the rear end of the tray 11 first strikes the conveyor belt 22, as shown in position E, and then the forward end of the tray 11 descends onto the conveyor belt 22, the force of the fall having been thus gradually and greatly diminished. The wooden tray 11 is now right side up and the iron tray 5 in inverted position on top of the cans.

The discharge conveyor 21 is of the same general construction as the receiving conveyor 6 and comprises a series of rollers 24 journalled in the side bars 25 and 26 supported from the uprights 27. The conveyor belt 22 travels in the direction indicated by he-arrows and is driven from a source of power not shown. In order that the trays and cans on conveyor belt 22 may be carried forward out of the way of the next succeeding trays and cans from the platform 14, conveyor belt 22 travels at a higher rate of speed than conveyor belt 12. Belt 12 is driven from belt 22 and the difference in speed is effected by having the pulley 28 (driven by conveyor belt 22) smaller in diameter than pulley 29 which drives the conveyor belt 12. The belt 30 connects the two pulleys. As the trays are carried forward by conveyor 21, the workman removes the inverted iron trays from the cans and the wooden trays 11 with the cans therein are taken to storage.

Having thus described the invention, what I claim as new is:—

1. An apparatus for inverting trays and the like comprising a platform mounted in equilibrium for receiving a loaded tray rightside up with an inverted tray thereon, and means for placing the trays on the platform to overcome its equilibrium, the momentum imparted to the trays as the platform and trays move to a position of rest causing the trays to be ejected upside down from the platform.

2. An apparatus for inverting trays and the like comprising a conveyor for receiving and carrying forward the trays rightside up, each tray having an inverted tray thereon, a platform pivoted at one end and extending forward beyond the conveyor, a counterweight for normally holding the platform in receiving position, the conveyor carrying a pair of trays forward onto the platform until the counterweight is over balanced, the momentum imparted to the trays as the platform descends causing the trays to be ejected from the platform upside down, and a second conveyor for receiving the trays as they are ejected from the platform.

3. An apparatus for inverting trays and the like comprising a pivoted platform having a counterweight for holding it in normal position, means for conveying a tray rightside up with an inverted tray over it onto the platform, the weight of the trays causing the platform to swing downward to position to eject the trays therefrom upside down, and means for conveying away the inverted trays.

4. An apparatus for inverting trays and the like comprising a pivoted platform provided with a counterweight tending to hold it in normal position, means for conveying a tray rightside up with an inverted tray over it onto the platform to disturb its equilibrium and swing the platform into position to eject the trays therefrom upside down, and means for receiving the inverted trays and conveying them away at a faster rate than they are conveyed to the platform.

5. An apparatus for inverting trays and the like comprising a platform for receiving the trays rightside up, each tray carrying an inverted tray, a conveyor for carrying the pairs of trays forward onto the platform, the platform being mounted on the discharge end of the conveyor so that when a pair of trays is properly placed thereon the platform is actuated to turn the trays upside down, and a second conveyor positioned with its receiving end under the discharge end of the first conveyor to carry away the inverted trays.

6. An apparatus for inverting trays and the like comprising a conveyor for carrying forward a tray rightside up and a second tray superposed upon the first tray bottomside up, a platform at the end of the conveyor for receiving the trays in the same relative position in which they were on the conveyor, the platform being mounted in equilibrium so that when the trays are properly placed thereon it is moved to eject the trays therefrom so that the top tray will land rightside up and the bottom tray will be bottomside up and means for receiving the inverted trays from the platform.

7. An apparatus for inverting trays and the like comprising a conveyor for carrying forward a tray positioned thereon rightside up with a second tray superposed on the first one bottomside up, a platform pivotally mounted at the discharge end of the conveyor for receiving the trays, the platform being held in normal position by a counterweight which is over balanced by the trays when they are properly positioned on the platform by the conveyor, the weight of the trays causing the platform to swing into such position as to eject the trays so that the top tray will fall first rightside up, and means for receiving the inverted trays from the platform and conveying them away.

WILLIAM E. MITTON.